United States Patent [19]

Funakoshi et al.

[11] Patent Number: 5,861,816
[45] Date of Patent: *Jan. 19, 1999

[54] VEHICLE ANTI-THEFT DEVICE

[75] Inventors: Hiroshi Funakoshi, Zama; Hiroshi Udou, Chigasaki, both of Japan

[73] Assignee: Nissan Motor Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 614,577

[22] Filed: Mar. 13, 1996

[30] Foreign Application Priority Data

Mar. 15, 1995  [JP]  Japan .................................. 7-055891

[51] Int. Cl.$^6$ .............................. B60L 1/00; B60R 25/04; G06K 5/00; G06F 7/04
[52] U.S. Cl. ................................... 340/825.31; 307/10.1; 307/10.5; 235/382; 340/825.3
[58] Field of Search ..................................... 307/9.1, 10.1, 307/10.5, 10.2, 10.3, 10.4, 10.6; 340/825.31, 825.6; 180/287

[56] References Cited

U.S. PATENT DOCUMENTS

| | | |
|---|---|---|
| 4,449,040 | 5/1984 | Matsuoka et al. ...................... 235/380 |
| 4,749,873 | 6/1988 | Mutoh et al. .............................. 307/10 |
| 5,193,641 | 3/1993 | Durrell ..................................... 180/287 |
| 5,412,379 | 5/1995 | Waraksa et al. .................... 340/825.72 |

FOREIGN PATENT DOCUMENTS 64-56253  3/1989  Japan .

*Primary Examiner*—Michael Horabik
*Assistant Examiner*—Anthony A. Asongwed
*Attorney, Agent, or Firm*—McDermott, Will & Emery

[57] ABSTRACT

A key for storing a predetermined electronic code is provided independently from a vehicle, and a mechanism is provided for comparing the electronic code in the key with a built-in stored electronic code after an ignition switch is switched from an OFF position to an ON position. When the electronic codes do not correspond, the vehicle is prevented from starting, and it is prevented from starting even when the electronic codes do correspond if the number of non-correspondences reaches a predetermined value. In this way, the vehicle is prevented from starting when the electronic codes match by chance when unauthorized start-ups are attempted.

13 Claims, 13 Drawing Sheets

COMMAND LIST

| TRANSMITTED FROM | MEANINGS | BINARY |
|---|---|---|
| ECCS(→IMMU) | PERFORM TEST TRANSMISSION | 00010001 |
| | INITIALIZE | 00110011 |
| | UPDATE IDENTIFYING CODE | 01110111 |
| IMMU(→ECCS) | IMMU IS NEW | 00010001 |
| | KEY CODES ARE IDENTICAL | 00110011 |
| | STORE IDENTIFYING CODE | 01110111 |

FIG. 4

PROTOCOL FORMAT

ECCS→IMMU:

IMMU → ECCS:

VEHICLE ANTI-THEFT DEVICE

FIELD OF THE INVENTION

This invention relates to vehicle antitheft prevention by verifying codes when a vehicle engine is started.

BACKGROUND OF THE INVENTION

In vehicles where the engine is controlled by an engine electronic control unit (referred to hereinafter as ECU) comprising a microprocessor, when an ignition switch is turned to a Start position by an ignition key, a starter cranks a crankshaft, a pulse signal is sent from the ECU to a fuel injection valve, fuel is injected from the valve into the engine, and the engine starts.

However if the ignition switch is shorted, the engine can still be started and the vehicle can be operated even without the ignition key. This mechanism was therefore inadequate from the viewpoint of preventing vehicle theft.

Tokkai Sho 64-56253 published by the Japanese Patent Office in 1989 discloses a vehicle antitheft device wherein a electronic code is built into the key. After the engine is started by the key, the electronic code sent from the key is compared with a code stored in the ECU, and if the codes do not match, engine operation is prevented.

If there is another electronic device capable of communicating with the ECU and that device sends a code to the ECU, there is very little probability that the codes will match. However, if a program built into the device repeatedly sends codes to the ECU, there is a risk that the codes will eventually match.

SUMMARY OF THE INVENTION

It is therefore an object of this invention to provide a vehicle antitheft device which can combat electronic devices that can send such an electronic code.

In order to achieve the above object, this invention provides a vehicle antitheft device for such a vehicle that has an ignition switch which starts a motive device for running the vehicle when the switch is switched from an OFF position to an ON position. The device comprises a mechanism for detecting that the ignition switch has been switched from the OFF position to the ON position, a first mechanism for storing an electronic code, a second mechanism for comparing the electronic code with a built-in electronic code when the ignition switch has been switched from the OFF position to the ON position, a mechanism for preventing the vehicle from starting when the electronic code does not correspond with the built-in code, a mechanisms for storing a number of times the electronic code does not correspond with said built-in code, and a mechanism for preventing the vehicle from starting when the number reaches a predetermined value.

It is preferable that the first mechanism is independent from said vehicle.

It is also preferable that the device further comprises a mechanism for clearing the number when a number of sequential correspondences between the codes reaches a predetermined value.

It is also preferable that the device further comprises a mechanism for updating the electronic code and the built-in code after the electronic code corresponds with the built-in code.

When the motive device comprises an engine, it is preferable that the first and second preventing mechanisms comprise a mechanism for stopping the operation of the engine.

The stopping mechanism may for example comprises a mechanism for cutting-off a fuel supply to the engine.

According to another aspect of this invention, the device comprises a mechanism for detecting that said ignition switch has been switched from the OFF position to the ON position, a key independent from the vehicle for storing a first electronic code, a first comparison mechanism for comparing the first electronic code with a first built-in electronic code when the ignition switch has been switched from the OFF position to the ON position, this first comparison mechanism also storing a second electronic code, a second comparison mechanism for comparing the second electronic code with a second built-in electronic code when the first electronic code corresponds with the first built-in code, a first preventing mechanism for preventing the vehicle from starting when either the first electronic code does not correspond with the first built-in code, or the second electronic code does not correspond with the second built-in code, a mechanism for storing a total number of times the first electronic code does not correspond with the first built-in code and the second electronic code does not correspond with the second built-in code, and a second preventing mechanism for preventing the vehicle from starting when the total number reaches a predetermined value.

It is preferable that the device further comprises a mechanism for clearing the total number when a number of sequential correspondences between the second electronic code and the second built-in code reaches a predetermined value.

It is also preferable that the device further comprises a mechanism for updating the second electronic code and the second built-in code after the second electronic code corresponds with the second built-in code.

It is also preferable that the device further comprises a mechanism for determining whether or not any of the first comparison mechanism and the second comparison mechanism is new, and a mechanism for updating the second electronic code and the second built-in code and clearing the total number stored in the storage mechanism when any of the first and second comparison mechanism is new, this updating mechanism being independent from the vehicle.

When the motive device comprises an engine, it is preferable that the first and second preventing mechanisms comprise a mechanism for stopping the operation of the engine.

The stopping mechanism may for example comprises a mechanism for cutting-off a fuel supply to the engine.

The details as well as other features and advantages of this invention are set forth in the remainder of the specification and are shown in the accompanying drawings.

BRIEF DESCRIPTION OF THE DRAWINGS

FIG. 4 is a chart of communication commands between an ECCS and IMMU according to this invention.

DESCRIPTION OF THE PREFERRED EMBODIMENTS

Figure 1:
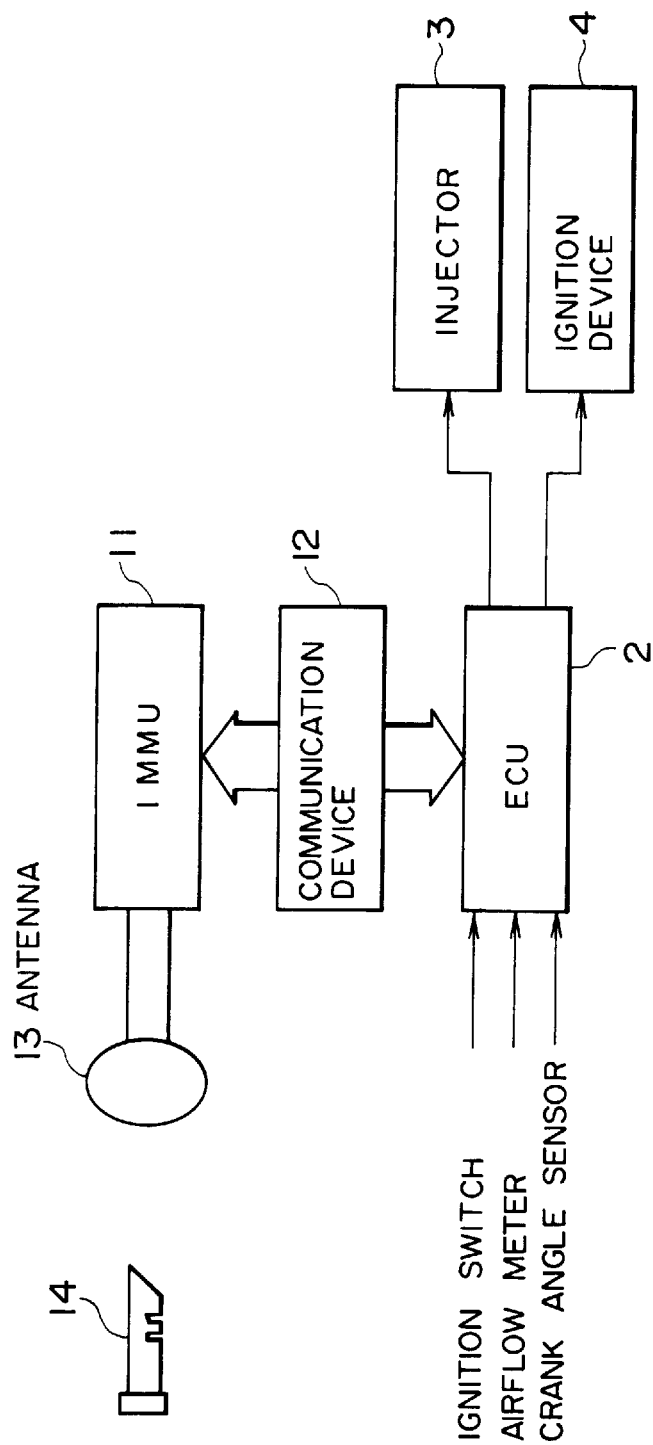
FIG. 1 is a schematic diagram of a vehicle antitheft device according to this invention.

Referring to FIG. 1 of the drawings, an engine is centrally controlled by an engine ECU 2 comprising a microprocessor. The main parameters controlled by the engine ECU 2 are air-fuel ratio or fuel injection amount, and ignition period. The engine ECU 2 controls fuel injection amount via an injector 3 provided in an engine intake manifold so as to obtain a predetermined air-fuel ratio. The fuel ignition period is also controlled via an ignition device 4. The engine ECU normally comprises a single unit, and the whole unit is replaced when it is faulty.

An IMMU 11, which is also an antitheft electronic control unit comprising a microprocessor, is also directly connected to the engine ECU 2 via a two-way communication device 12. As in the case of the ECU 2, the IMMU generally also comprises a single unit, the whole unit being replaced when it is faulty.

These two control units are provided with non-volatile memories or EEPROMs for retaining stored data even when power is not supplied. It is however not essential that these control units are microprocessors and ordinary electronic components may be used instead.

The IMMU 11 is combined with a transponder key 14. The transponder key 14 has a function for transmitting an unique key code, and when a predetermined electromagnetic or radio wave is sent from the IMMU 11 via an antenna 13, the transponder key 14 returns this unique code.

The engine ECU determines whether or not this code is identical to the key code stored in the IMMU 11, and it is only when these codes are identical that the identifying codes stored respectively in the engine ECU and IMMU 11 are compared. If the IMMU 11 is removed and an IMMU from another vehicle is fitted or the IMMU 11 remains installed and the transponder key from another vehicle is fitted, the key code will not match and a comparison between the identifying codes in the IMMU and engine ECU will not be made.

The processing performed by the engine ECU 2 regarding theft prevention will now be described with reference to FIGS. 2A, 2B, 2C and 3.

As there is two-way communication between the engine ECU 2 and IMMU 11, when commands or data are to be sent from the engine ECU 2 to the IMMU 11, the communication mode must first be switched to the ECU to IMMU mode, and when commands or data are to be sent from the IMMU 11 to the engine ECU 2, the communication mode must first be switched to the IMMU to ECU mode. A description of this switching of the communication mode will be omitted.

Figure 2A:
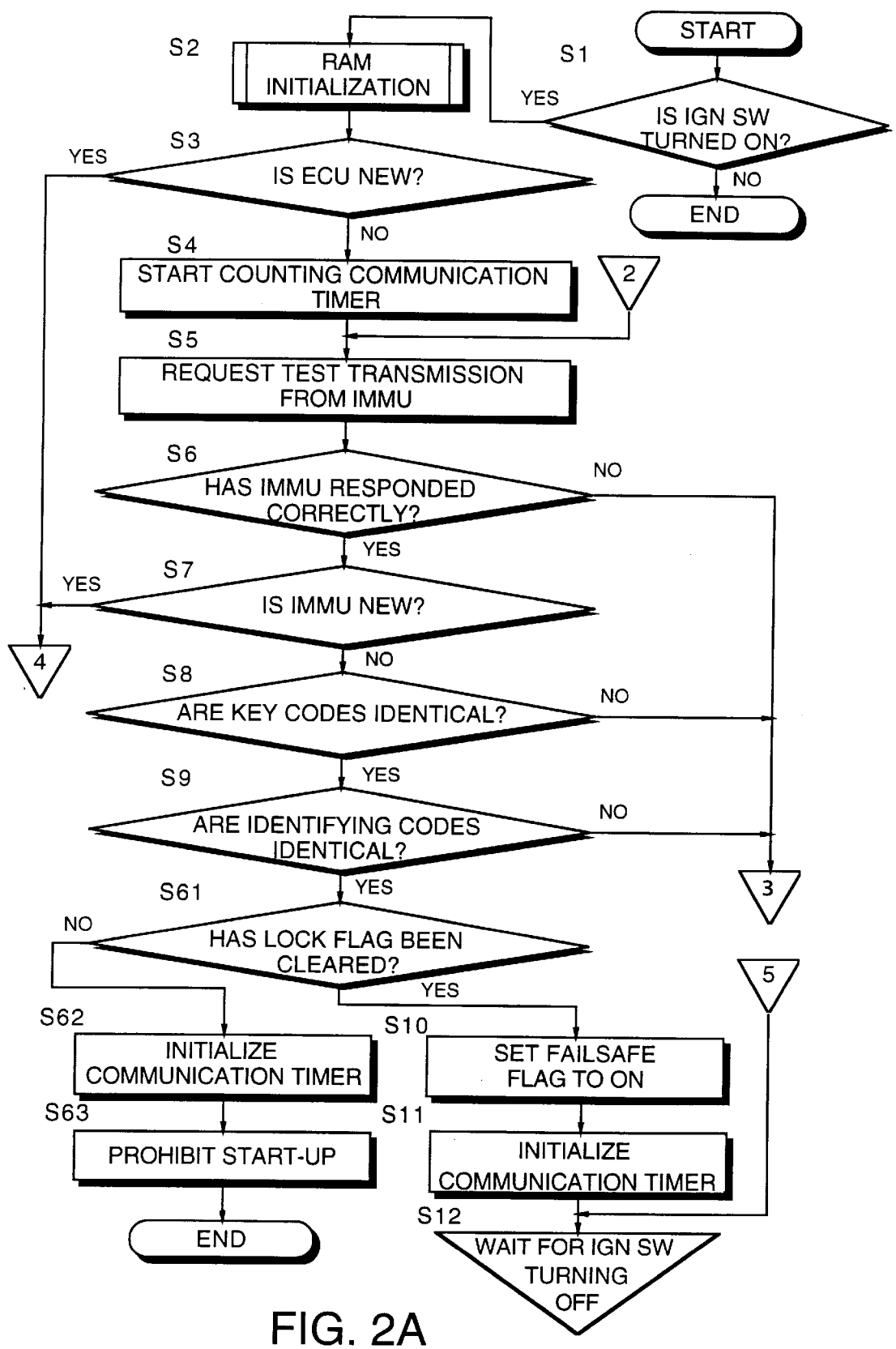
FIGS. 2A, 2B, 2C, 2D are flowcharts describing an antitheft control process according to this invention.

First, in a step S1 of FIG. 2A, the engine ECU 2 determines whether or not the ignition switch (abbreviated as IGN SW in the figure) has been switched from the "OFF" position to the "ON" position. If it has not been switched from "OFF" to "ON", the routine is terminated.

If it has been switched from "OFF" to "ON", a RAM is initialized in a step S2, and it is determined whether or not the engine ECU is new in a step S3. This is done by determining whether or not a "new" flag stored in an EEPROM of the engine ECU is set to "new". If it is not new, a communication timer is started in steps S4, S5, and a test transmission from the IMMU is requested. The communication timer is provided to measure the elapsed time from the start of communication.

In a step S6 it is verified whether or not there was a response from the IMMU, and if there was, i.e. if the test transmission was satisfactory, it is determined in a step S7 whether or not the IMMU is new. If a new flag stored in an EEPROM of the IMMU is not set to "new", it is determined that the IMMU is not new and the routine proceeds to a step S8. The key code transmitted by the transponder key and the key code set in the IMMU are then compared as described hereinabove, and when these codes are identical, it is determined whether or not the identifying codes are identical in a step S9. The identifying codes are respectively stored in the ECU and IMMU.

For this purpose, an identifying code transmission request is sent from the engine ECU to the IMMU, and the identifying code returned by the IMMU is then compared with the identifying code stored in the EEPROM of the engine ECU.

If the identifying codes are identical, it is determined in a step S61 whether or not a lock flag is cleared. This lock flag is set to ON in the flowchart of FIG. 6 described hereinafter, and it is cleared, i.e. set to 0, when the device is shipped from the factory.

If the lock flag is 0, a fail-safe flag is set to ON in a step S10. If there were no fail-safe flag, there is a possibility that start-up prohibition might be performed while the vehicle was running and that the fuel supply to the engine would be cut off. The fail-safe flag limits the vehicle antitheft check to when the engine is starting so that such a fuel cut does not occur when the vehicle is running. Prior to start-up, the fail-safe flag is OFF, and only when the fail-safe flag is ON, can the start-up procedure be continued. Next, the communication timer is initialized in a step S11.

When the lock flag is ON in the step S61, the communications timer is initialized in a step S62 and start-up is prohibited in a step S63.

Figure 2B:
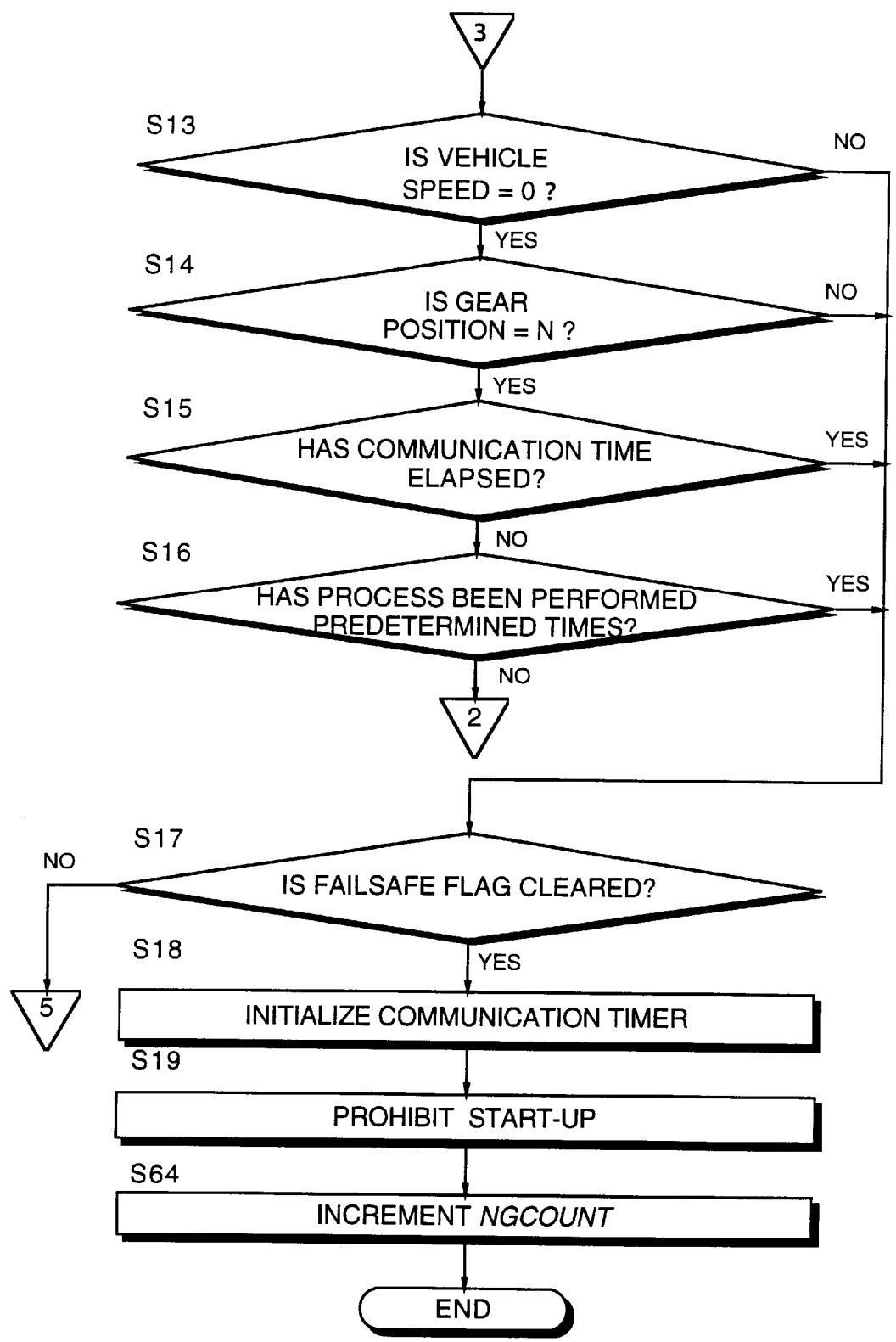

If there was no response or even if there was a response from the IMMU and the checksum shows an error in the step S6, the routine proceeds to a step S13 of FIG. 2B. Moreover, even if a transmission problem or non-matching of codes is found in the steps S8, S9, the routine still proceeds to the step S13.

In the steps S13–16, it is determined whether or not the vehicle is running (step S13), whether or not the gear is in a position other than neutral (abbreviated as N in the figure) (step S14), whether or not the time measured by the communication timer has exceeded a predetermined time (step S15), and whether the processing from the step S5 to the step S16 has been performed a predetermined number of times (step S16). If the determination results are all negative, the processing from the step S5 to the step S16 is repeated.

If any of the above items are affirmative, the routine proceeds to a step S17 and the fail-safe flag is determined. If the fail-safe flag is cleared, the communication timer is initialized in a step S18, and engine start-up is prohibited by for example cutting off the fuel supply in a step S19.

As the routine does not pass through the step S10 when it proceeds from the steps S6, S8, S9 to the step S13, the fail-safe flag is cleared. In other words, if there is a transmission problem or any of the key codes or identifying codes do not match on start-up, the start-up prohibition procedure is always performed.

Figure 2C:
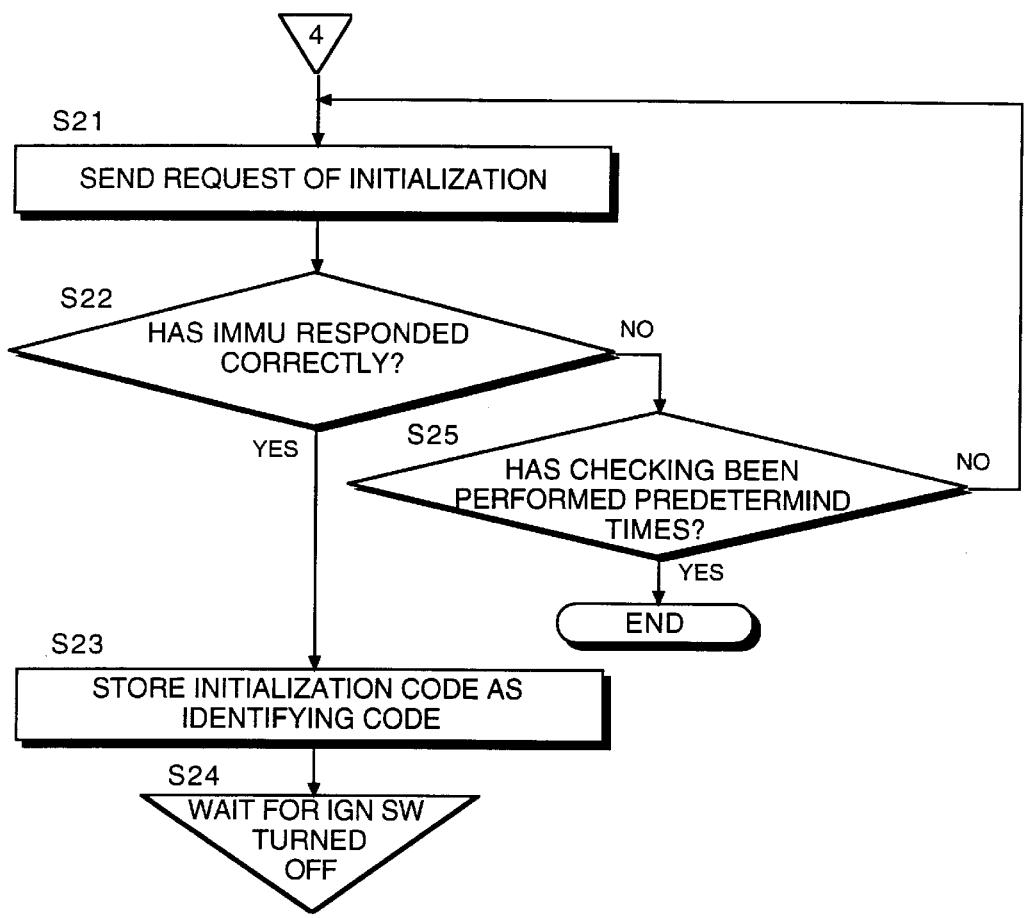
Figure 2D:
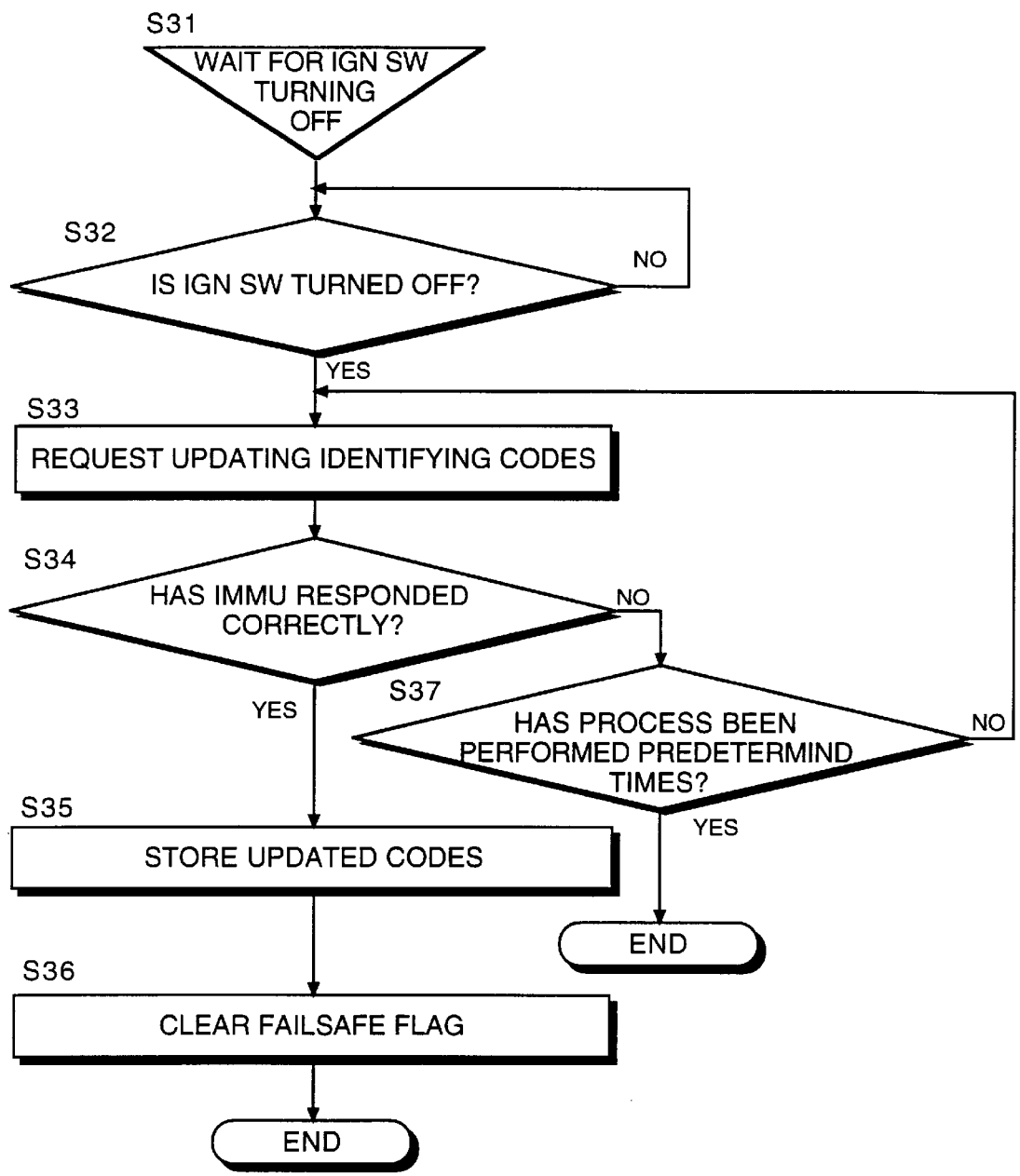

FIG. 2D shows the processing performed when driving of the vehicle is completed. This process is performed when the ignition switch is switched from the "ON" position to the "OFF" position. When this switchover is detected in a step S32, an identifying code update request is issued together with a new identifying code from the engine ECU to the IMMU in a step S33.

In a step S34, it is determined whether or not there was a normal response from the IMMU.

If the response from the IMMU was not normal, it is determined whether or not the processing from the step S33 to the step S37 has been performed a predetermined number of times. This procedure is repeated a predetermined number of times and if the response from the IMMU does not normalize during this period, the driving completion routine is terminated forthwith.

If there was a normal response from the IMMU in the step S34, the updated identifying code is stored in the EEPROM of the engine ECU in a step S35. The fail-safe flag is then cleared in a step S36 and the driving completion routine is terminated.

When the driving completion routine is terminated after the steps S35, S36, at the next engine start-up, therefore, the updated identifying code is stored in both the engine ECU and IMMU and the fail-safe flag is cleared.

Returning to FIG. 2A, when it is determined that either the engine ECU or IMMU is new (step S3 or S7), the identifying codes stored in the engine ECU and IMMU are initialized as shown in FIG. 2C.

In the initialization process, an initialization request is transmitted from the engine ECU to the IMMU in a step S21. The transmission of this initialization request is performed according to a command input by a third ECU separate from the engine ECU and IMMU. Initialization of identifying codes does not occur unless an initialization command is input from the third ECU.

Upon receiving this initialization request, an initializing code is read from the EEPROM stored in the engine ECU and transmitted to the IMMU. The IMMU stores the initializing code as an identifying code and returns it to the engine ECU.

The engine ECU, in a step S22, determines whether or not this response was normal. If the response showed an error, it is determined in a step S25 whether or not the transmission check was performed a predetermined number of times. If the check has not been performed a predetermined number of times, the processing from the step S21 to the step S25 is repeated, and when it has been performed a predetermined number of times, it is determined that initialization is impossible and the routine of FIG. 2C is terminated.

If there was no error in the transmission check in the step S22, the routine proceeds to a step S23, and the initialization code is stored in the EEPROM of the ECU as an identifying code.

Immediately after this initialization routine, the ignition switch switches "OFF" on standby. When the engine is started on the next occasion, the stored identifying code is used for the matching test.

Figure 3:
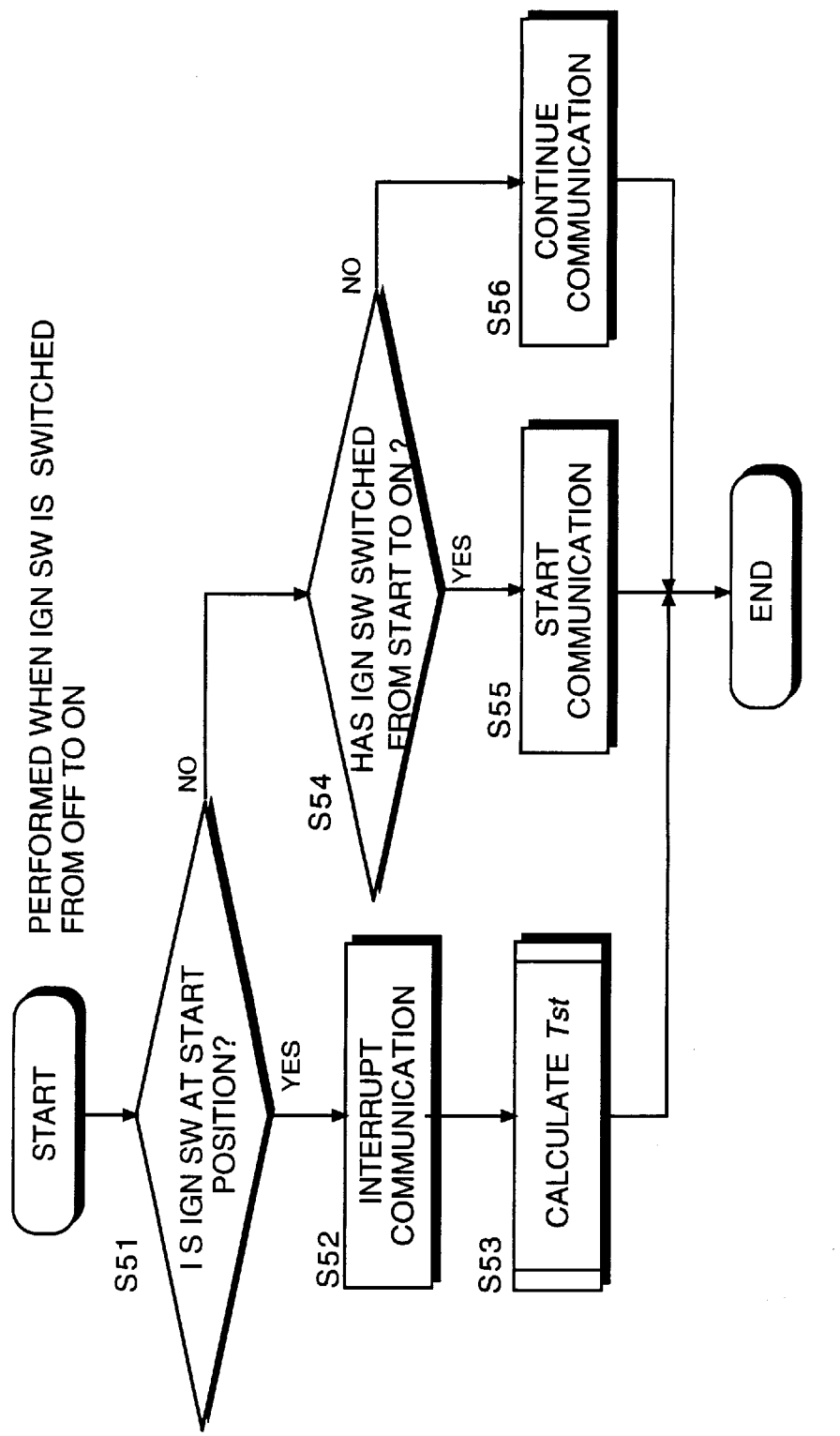
FIG. 3 is a flowchart describing a communication control process on engine start-up according to this invention.

FIG. 3 is a flowchart executed by the engine ECU for the purpose of communication control during start-up. When the ignition switch is in the "START" position in a step S51, communication is interrupted or terminated in a step S52 and a start-up injection pulse width Tst is computed in a step S53.

When the ignition switch is not in the "START" position in the step S51, and the switch has been switched from the "START" position to the "ON" position in a step S54, the routine proceeds to a step S55 and communication is started or resumed.

If the determination of the step S54 is negative, communication is continued in a step S56.

The commands exchanged between the engine ECU and IMMU which appear in the above flowcharts are listed in FIG. 4.

Figure 5A:
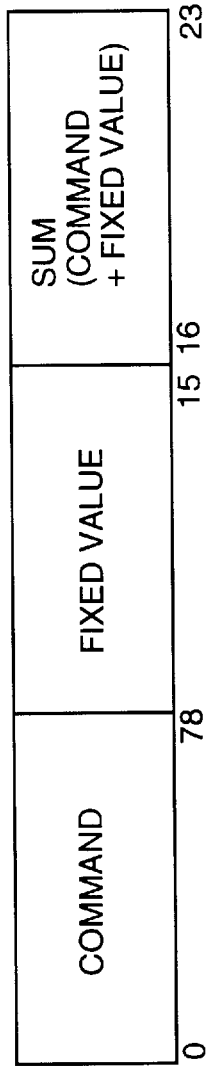
FIGS. 5A, 5B are charts describing a communication protocol between the ECCS and IMMU according to this invention.

As can be seen from this figure, each command is an 8 bit binary code. These commands are transmitted according to the protocol format shown in FIGS. 5A, 5B. Taking the identifying code check as an example, a 24 bit signal comprising the 8 bit identifying code update command of FIG. 4, an 8 bit fixed value and an 8 bit checksum for error detection as shown in FIG. 5A, is transmitted from the engine ECU to the IMMU. The checksum and 8 bit fixed value are respectively divided into digits of 1 byte each, and the presence or absence of a communication error being determined by checking the sum of these digits.

Figure 5B:
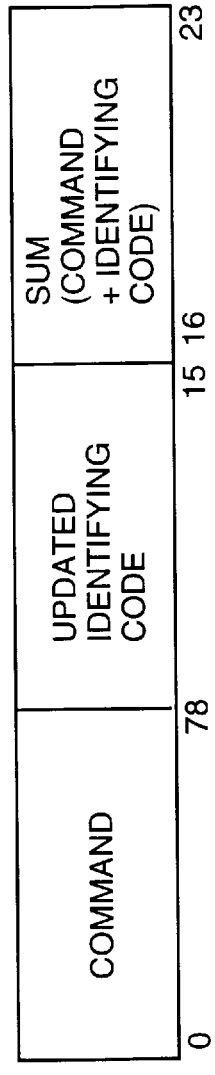

On the other hand, a 24 bit signal comprising the 8 bit identifying code registration request of FIG. 4, an 8 bit identifying code and an 8 bit checksum as shown in FIG. 5B, is returned from the IMMU to the engine ECU.

There are $2^8=256$ combinations of the aforesaid identifying codes, and the identifying code is changed on each engine start-up. Therefore, if a device capable of communicating with the engine ECU is provided and a desired identifying code is returned from the device to the engine ECU, the probability that the codes will match is low.

However, if an unauthorized start-up operation is repeated on a large number of occasions, the codes will eventually match.

In order to avoid this risk, according to this invention, the steps S61, S62, S63 and S64 are provided in the flowchart of FIGS. 2A and 2B to count the number of incorrect matches, and when this number has reached a predetermined number of occasions, the vehicle is prevented from starting.

In the flowchart of FIG. 2B, after start-up is prohibited in a step S19, a counter value NGCOUNT is incremented in a step S64. This counter measures the total number of times the start-up prohibition procedure has been performed, and its initial value is 0. The value of NGCOUNT is stored in the EEPROM in the engine ECU.

Figure 6:
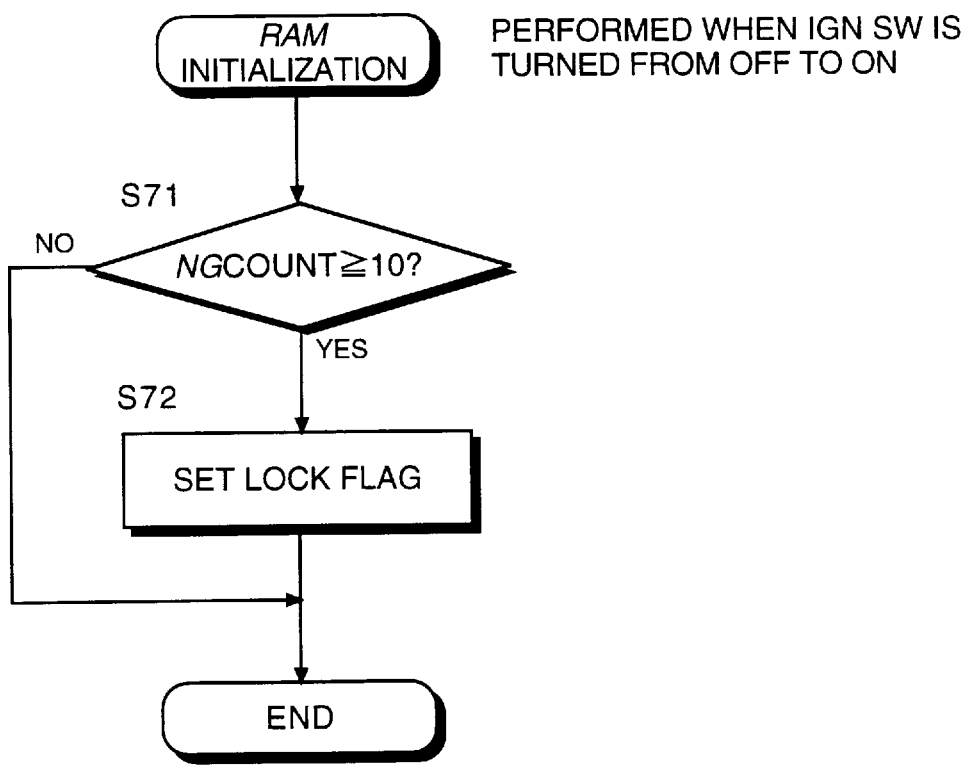
FIG. 6 is a flowchart showing a lock flag set up process during engine start-up according to this invention.

The flowchart of FIG. 6 shows the procedure executed in initializing the RAM, i.e. the procedure executed when the ignition switch is switched from OFF to ON.

In a step S71, the counter value NGCOUNT is compared with a predetermined value 10. If the result of the comparison shows that NGCOUNT is less than 10, the routine of FIG. 6 is terminated, and if the result of the comparison is 10 or more, the routine proceeds to a step S72 where a lock flag is set. This predetermined value is not limited to 10 and may be any number greater than 1.

When the engine start-up operation is not performed correctly, start-up is prohibited by the vehicle antitheft check. The value of NGCOUNT is incremented on each such occasion.

When the number of unauthorized start-ups reaches 10, the lock flag is set to ON. When the lock flag is ON, start-up prohibition is not released even if there is subsequently no transmission problem and the key codes/identifying codes match.

Hence, even if the key/identifying codes are made to match by a number of attempts to by-pass the vehicle antitheft function and start the engine, or by analyzing the inputs/outputs of the various units, start-up is prohibited if the prohibition process was invoked 10 or more times before the codes match. This also offers a satisfactory level of protection against unauthorized operation using electronic devices.

When start-up is performed by the authorized procedure, NGCOUNT remains at 0, the value to which it is set when the vehicle leaves the factory, and the lock flag is OFF.

Figure 7A:
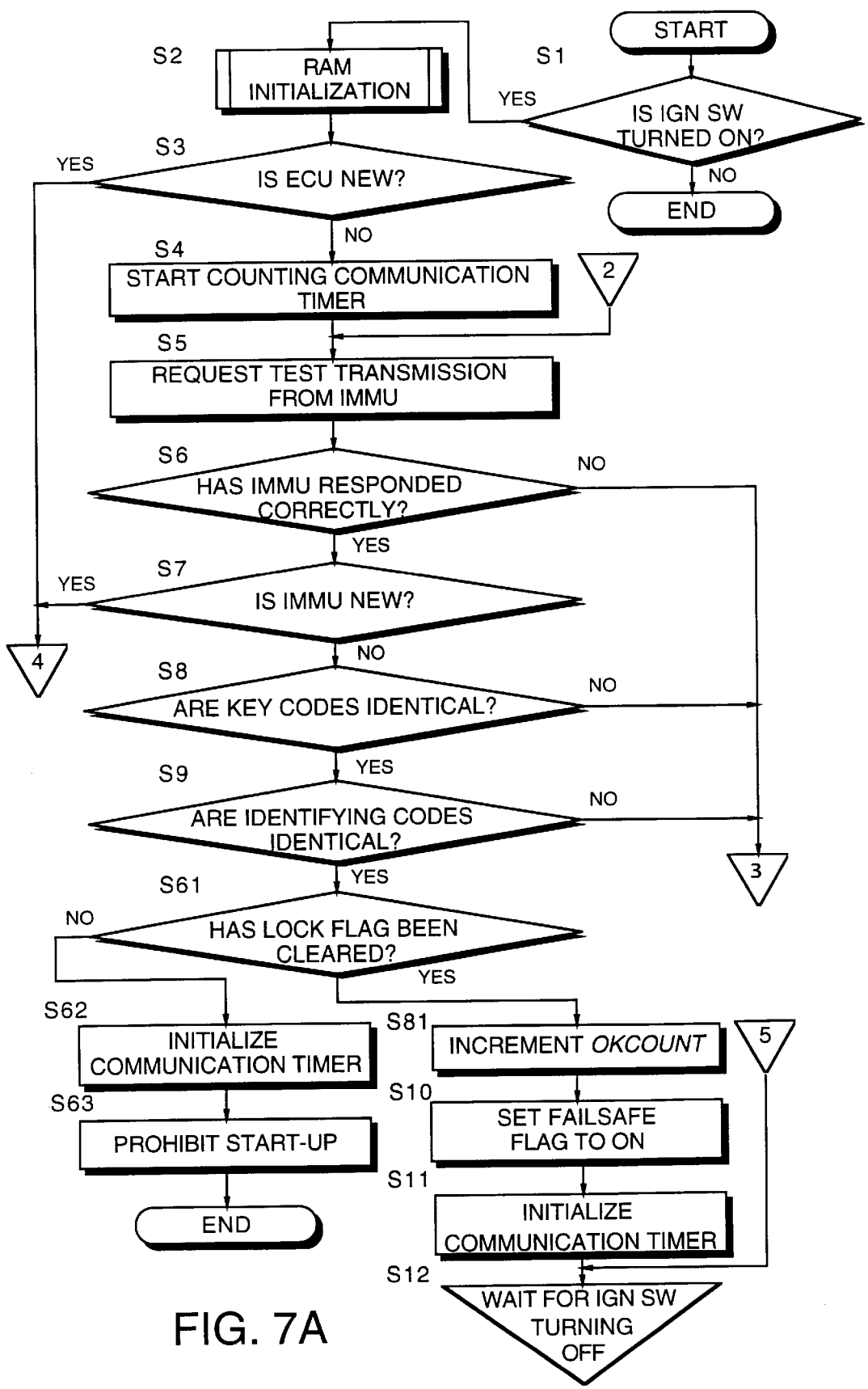
FIGS. 7A, 7B, 7C are flowcharts describing an antitheft control process according to a second embodiment of this invention.
Figure 7B:
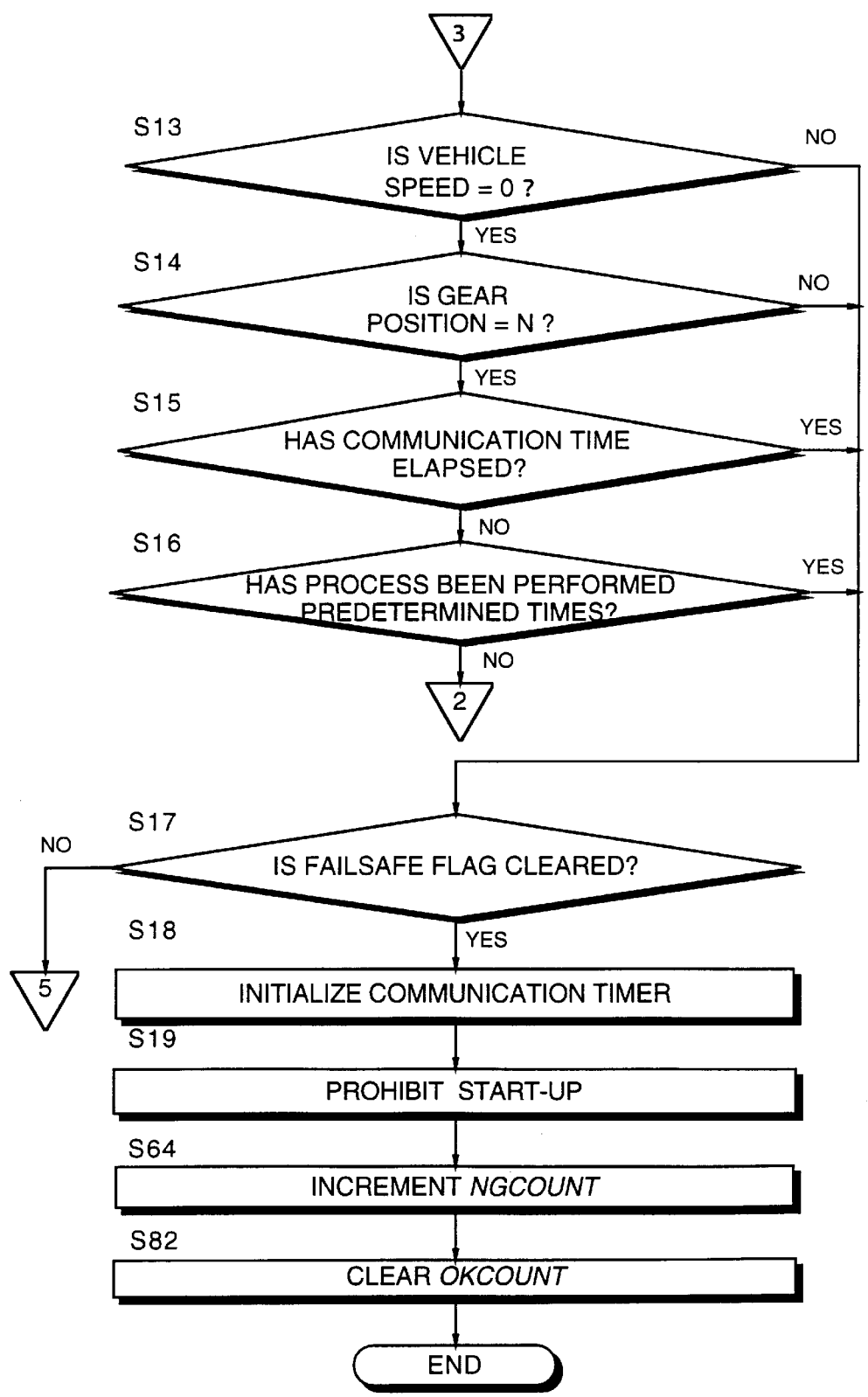
Figure 7C:
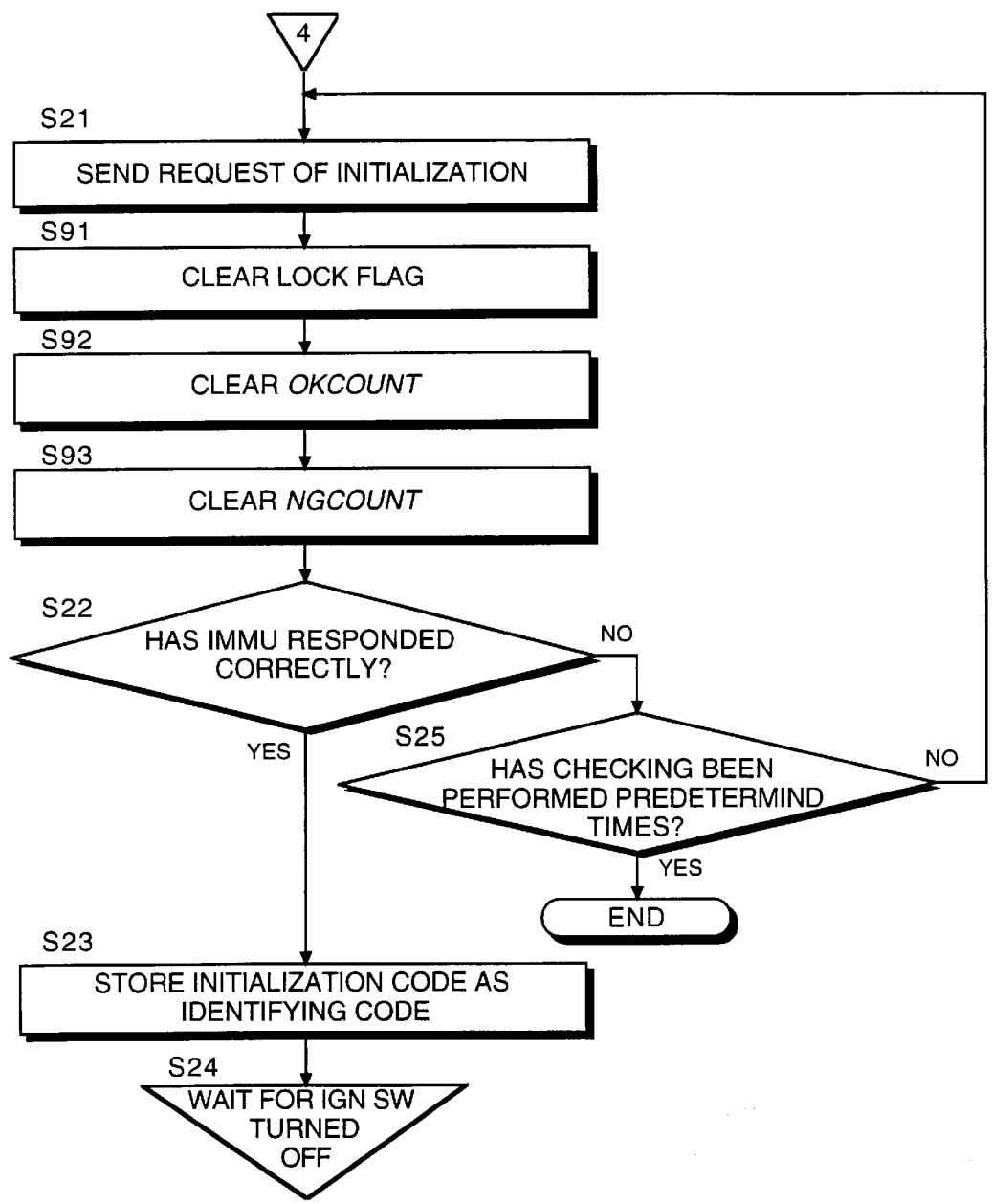
Figure 8:
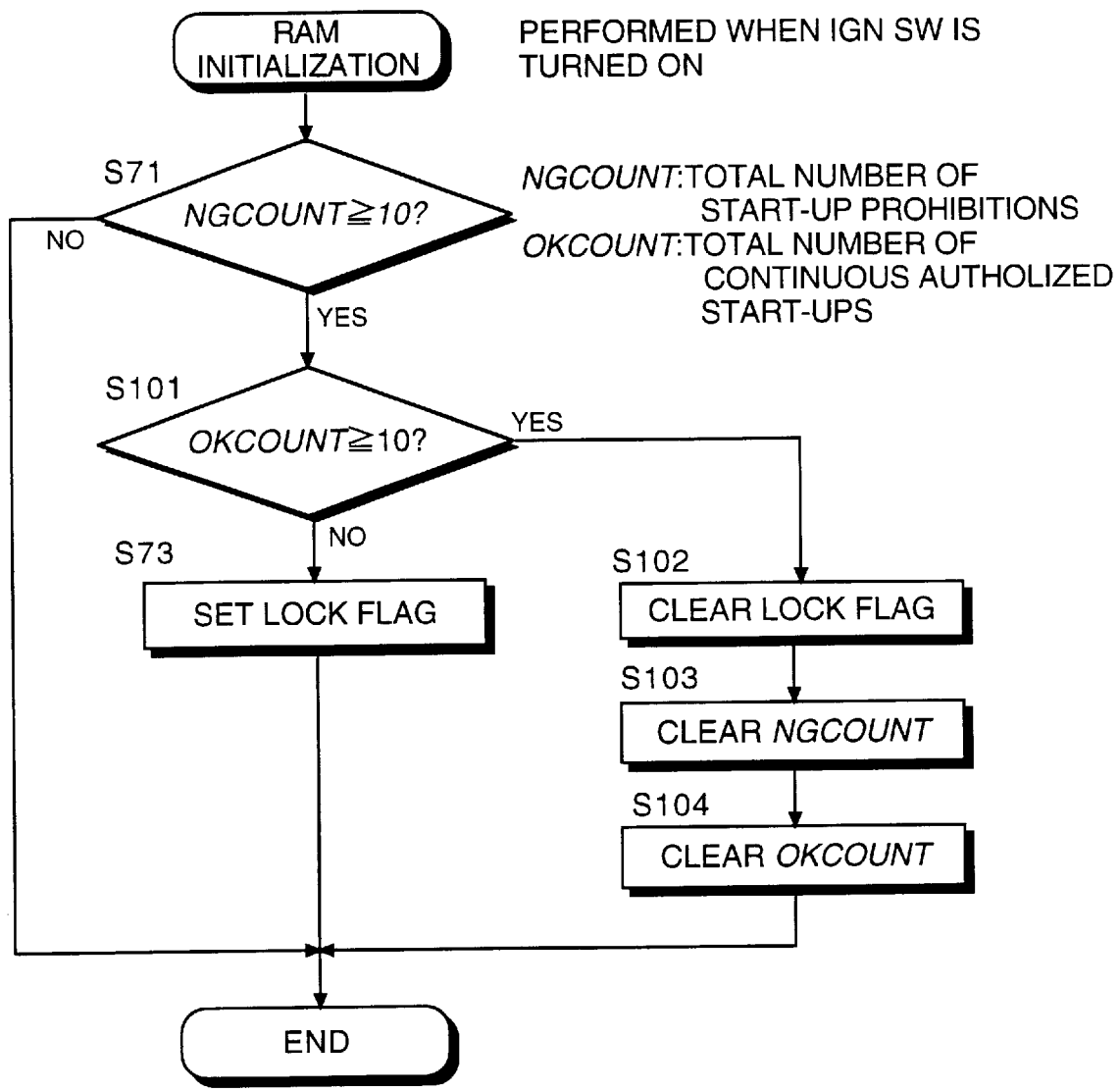
FIG. 8, is a flowchart showing a lock flag setup process during engine start-up according to the second embodiment of this invention.

FIGS. 7A, 7B, 7C and 8 show a second embodiment of this invention. FIGS. 7A, 7B, 7C correspond to FIGS. 2A, 2B, 3C of the first embodiment. FIG. 8 corresponds to FIG. 6 of the first embodiment.

The differences of this embodiment from the first embodiment are steps S81, S82 of FIG. 7A, steps S91, S92, S93 of FIG. 7B and steps S101, S102, S103, S104 of FIG. 8.

In the step S81 of FIG. 7A, a counter value OKCOUNT is incremented. This counter measures the total number of times that authorized start-up is performed. The initial value of OKCOUNT is 0, and the incremented value of OKCOUNT is stored in the EEPROM of the engine ECU.

This value is compared with a reference value of 10 in a step S101 in FIG. 8. When the value of OKCOUNT reaches 10 or more, the lock flag is cleared to OFF in a step S102, and the two counter values NGCOUNT, OKCOUNT are both initialized in steps S103, S104. If the lock flag is OFF, if there is no transmission problem during start-up and the key codes/identifying codes match in FIG. 7A, the routine can again proceed from the step S61 to the setting of the fail-safe flag in the step S10. The reference value used to compare with the counter value OKCOUNT is not limited to 10, and may be any value greater than 1.

Even after the lock flag has been switched ON due to repeated unauthorized start-up attempts, provided the authorized start-up procedure is repeated for 10 or more times, the two counter values NGCOUNT, OKCOUNT are initialized, the lock flag is cleared and the engine can be started.

On the other hand according to the first embodiment, the lock flag cannot be reset once it has been switched ON.

In FIG. 7C showing the initialization process, when an initialization command is input from the third ECU, the lock flag is cleared in a step S91, the counter value OKCOUNT is initialized in a step S92, and the counter value NGCOUNT is initialized in a step S93.

Antitheft control is performed normally from the next start-up and identifying codes are compared, however if the lock flag is ON, the lock flag does not switch over to OFF unless the authorized start-up procedure is repeated for 10 or more times. According to this embodiment, when an initialization request is received from the third ECU, the lock flag is immediately cleared and the two counter values are initialized, so there is no need to repeat the correct start-up procedure a predetermined number of times when the ECU is replaced by a new unit.

According to the aforesaid embodiments, the vehicle is prevented from starting by cutting off fuel supply to the engine, however the operation of the brakes or the transmission may be used instead. Further, in addition to physically preventing start-up of the vehicle, start-up may be indirectly prevented by issuing an alarm, etc.

According to the above embodiments, identifying codes were compared once start-up had been authorized when an attempt was made to start the engine, and the vehicle was prevented from starting if the codes did not match. Alternatively, however, identifying codes may be compared after start-up has been prohibited on a start-up attempt, and the vehicle permitted to start if the codes match.

Further, according to the above embodiments, the vehicle was prevented from starting based on the results of comparing a key code stored in a transponder and comparing an identifying code, however this invention may be applied also for example to the case where a mechanical key containing an electronic code is used as in the aforesaid prior art. In this case, the vehicle antitheft device prevents the vehicle from starting when there has been a plurality of mismatches between the electronic code stored in the mechanical key and the code stored in the engine ECU.

Accordingly, although the present invention has been shown and described in terms of the preferred embodiment thereof, it is not to be considered as limited by any of the perhaps quite fortuitous details of said embodiment, or of the drawings, but only by the terms of the appended claims, which follow.

We claim:

1. A vehicle antitheft device for preventing a theft of a vehicle, said vehicle having an ignition switch which starts a motive device for running the vehicle when said switch is switched from an OFF position to an ON position, comprising:

means for detecting that said ignition switch has been switched from the OFF position to the ON position, a key independent from the vehicle for storing a first electronic code, first comparison means for comparing said first electronic code with a first built-in electronic code when said ignition switch has been switched from the OFF position to the ON position, said first comparison means also storing a second electronic code, second comparison means for comparing said second electronic code with a second built-in electronic code when said first electronic code corresponds with said first built-in code said second built-in code being provided independently of said first comparison means, first preventing means for preventing the vehicle from starting when either said first electronic code does not correspond with said first built-in code, or said second electronic code does not correspond with said second built-in code, means for storing a number of times said first electronic code does not correspond with said first built-in code, and said second electronic code does not correspond with said second built-in code, and second preventing means for preventing the vehicle from starting when said total number reaches a predetermined value.

2. The vehicle antitheft device as defined in claim 1, further comprising means for clearing said total number when a number of sequential correspondences between said second electronic code and said second built-in code reaches a predetermined value.

3. The vehicle antitheft device as defined in claim 1, further comprising means for updating said second electronic code and said second built-in code after said second electronic code corresponds with said second built-in code.

4. The vehicle antitheft device as defined in claim 1, further comprising means for determining whether or not any of said first comparison means and said second comparison means is new, and means for updating said second electronic code and said second built-in code and clearing said total number when any of said first and second comparison means is new, said updating means being independent from said vehicle.

5. The vehicle antitheft device as defined in claim 1, wherein said motive device comprises an engine, and said first and second preventing means comprise means for stopping the operation of said engine.

6. The vehicle antitheft device as defined in claim 1, wherein said stopping means comprises means for cutting-off a fuel supply to said engine.

7. A vehicle anti-theft device for preventing a theft of a vehicle, comprising:

a transmitter configured to transmit a code peculiar to a vehicle;

a comparator for determining whether or not the code transmitted from said transmitter is identical with a first built-in code;

a counter counting a number of times the comparator determines the code transmitted from said transmitter is not identical to the first built-in code;

a controller responsive to at least one of said comparator and said counter to prohibit starting an engine of the vehicle when at least one condition, of a plurality of predetermined conditions is indicated by said at least one of said comparator and said counter including a first condition wherein the comparator indicates that the code transmitted from said transmitter is not identical to the first built-in code, said controller having a first identifying code; and an engine control unit, provided separately from said controller, for controlling the engine and having a second identifying code, said engine control unit prohibiting starting the engine when the first identifying code is not identical to the second identifying code.

8. The vehicle anti-theft device as defined in claim 7, wherein said at least one of said plurality of conditions further includes a second condition, wherein a count of said counter is greater than a predetermined value, said controller prohibiting starting the engine when either of the first and second conditions is indicated by either of said comparator and said counter.

9. The vehicle anti-theft device as defined in claim 8 wherein said controller instructs said engine control unit to stop the engine in order to prohibit starting the engine.

10. The vehicle anti-theft device as defined in claim 9, further comprising a memory storing a number of times when the identifying codes of said controller and said engine control unit are not identical, wherein said controller prohibits starting the engine when the number stored in the memory exceeds another predetermined value.

11. A vehicle anti-theft device, comprising:

a comparator for determining whether or not a transmitted code is identical with a first built-in code;

a counter counting a number of times the comparator determines the transmitted code is not identical to the first built-in code;

a controller responsive to at least one of said comparator and said counter to prohibit starting an engine of the vehicle when said transmitted code is not identical with said predetermined built-in code or when the number counted by said counter is more than a predetermined value, said controller having a first identifying code; and an engine control unit, provided separately from said controller, for controlling the engine and having a second identifying code, said engine control unit prohibiting starting the engine when the first identifying code is not identical to the second identifying code.

12. A vehicle anti-theft device for preventing a theft of a vehicle, said vehicle having an ignition switch which starts a motive device for running the vehicle when said switch is switched from an OFF position to an ON position, comprising:

means for detecting that said ignition switch has been switched from the OFF position to the ON position, a key independent from the vehicle for storing a first electronic code, first comparison means for comparing said first electronic code with a first built-in electronic code when said ignition switch has been switched from the OFF position to the ON position, said first comparison means also storing a second electronic code different from said first built-in electronic code, second comparison means for comparing said second electronic code with a second built-in electronic code when said first electronic code corresponds with said first built-in code, said second comparison means being provided independently of said first comparison means, first preventing means for preventing the vehicle from starting when either of said first electronic code and said second electronic code does not correspond with a respective one of said first built-in code and said second built-in code, means for storing a total number of times said first electronic code does not correspond with said first built-in code, and second preventing means for preventing the vehicle from starting when said total number reaches a predetermined value.

13. A vehicle anti-theft device for preventing a theft of a vehicle, said vehicle having an ignition switch which starts a motive device for running the vehicle when said switch is switched from an OFF position to an ON position, comprising:

a sensor for detecting that the ignition switch has been switched from the OFF position to the ON position, a key independent from the vehicle for storing a first electronic code, a first circuit functioning to compare said first electronic code with a first built-in electronic code when said ignition switch has been switched from the OFF position to the ON position, said first circuit also storing a second electronic code different from said first built-in electronic code, a second circuit functioning to compare said second electronic code with a second built-in electronic code, stored independently of the first circuit, when said first electronic code corresponds with said first built-in electronic code, to store a total number of times said first electronic code does not correspond with said first built-in electronic code and said second electronic code does not correspond with said second built-in electronic code, and to prevent the vehicle from starting when either of said first and second electronic codes does not correspond with a respective one of said first and second built-in electronic codes, or when said total number reaches a predetermined value, said second circuit being provided independently of said first circuit.

* * * * *